(No Model.) 3 Sheets—Sheet 1.
E. G. LATTA.
VELOCIPEDE.

No. 380,495. Patented Apr. 3, 1888.

Witnesses: Chas. J. Buchheit, Geo. J. Buchheit Jr.

E. G. Latta, Inventor.
By Wilhelm Bonner, Attorneys.

(No Model.) 3 Sheets—Sheet 2.
E. G. LATTA.
VELOCIPEDE.
No. 380,495. Patented Apr. 3, 1888.
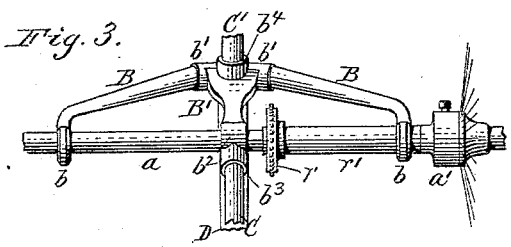
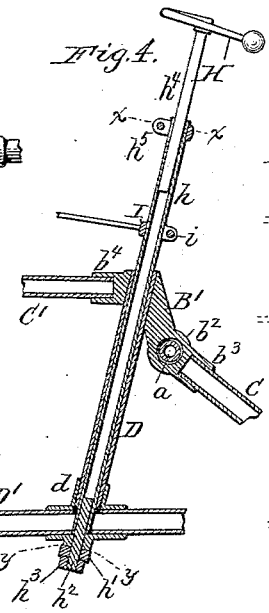
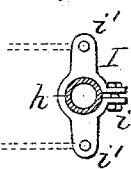
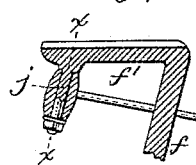
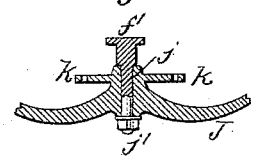
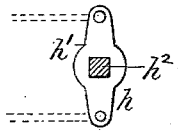
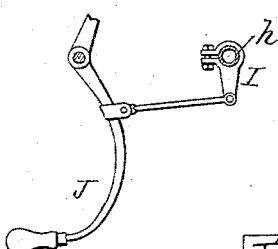
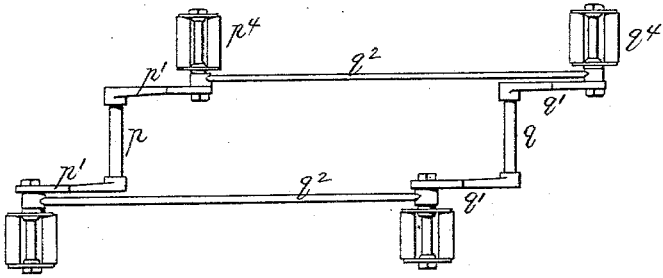
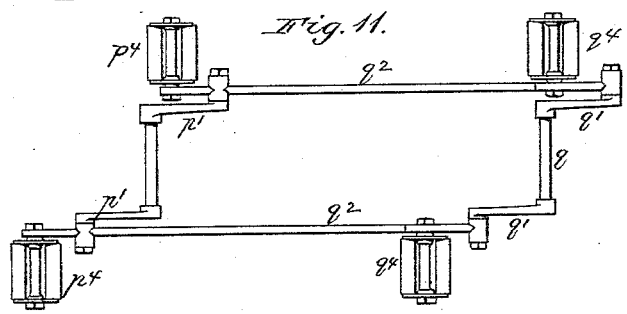
Witnesses:
Chas. J. Buchheit
Geo. J. Buchheit Jr.
Inventor:
E. G. Latta
By Wilhelm Bonner
Attorneys.

(No Model.) 3 Sheets—Sheet 3.

E. G. LATTA.
VELOCIPEDE.

No. 380,495. Patented Apr. 3, 1888.

Witnesses: Chas. J. Buchheit, Geo. J. Buchheit Jr.

E. G. Latta, Inventor.
By Wilhelm & Bonner, Attorneys.

UNITED STATES PATENT OFFICE.

EMMIT G. LATTA, OF FRIENDSHIP, NEW YORK, ASSIGNOR TO THE POPE MANUFACTURING COMPANY, OF PORTLAND, MAINE.

VELOCIPEDE.

SPECIFICATION forming part of Letters Patent No. 380,495, dated April 3, 1888.

Application filed February 9, 1887. Serial No. 227,043. (No model.)

*To all whom it may concern:*

Be it known that I, EMMIT G. LATTA, of Friendship, in the county of Allegany and State of New York, have invented new and useful Improvements in Velocipedes, of which the following is a specification.

This invention relates to tandem tricycles, and has the object to produce a machine which can be more easily driven and controlled than the machines now in use, to reduce the vibrations resulting from the steering-wheel, and to provide a simple device whereby the speed can be changed as the condition of the roads may require.

My invention consists of the improvements which will be hereinafter fully set forth, and pointed out in the claims.

Figure 1:
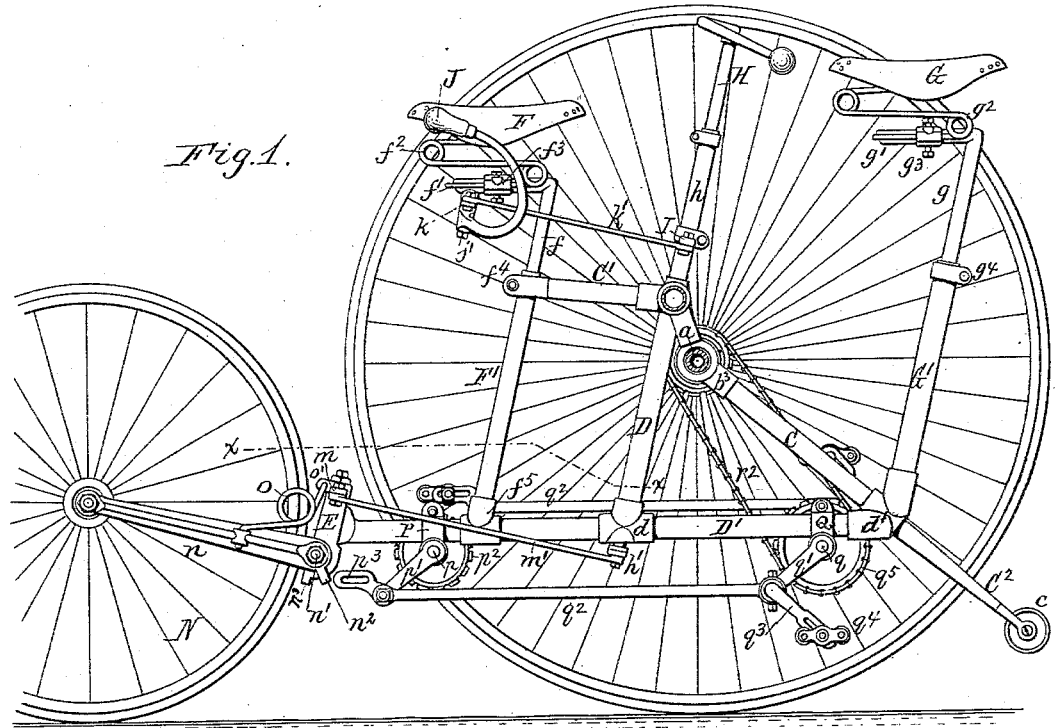
Figure 2:
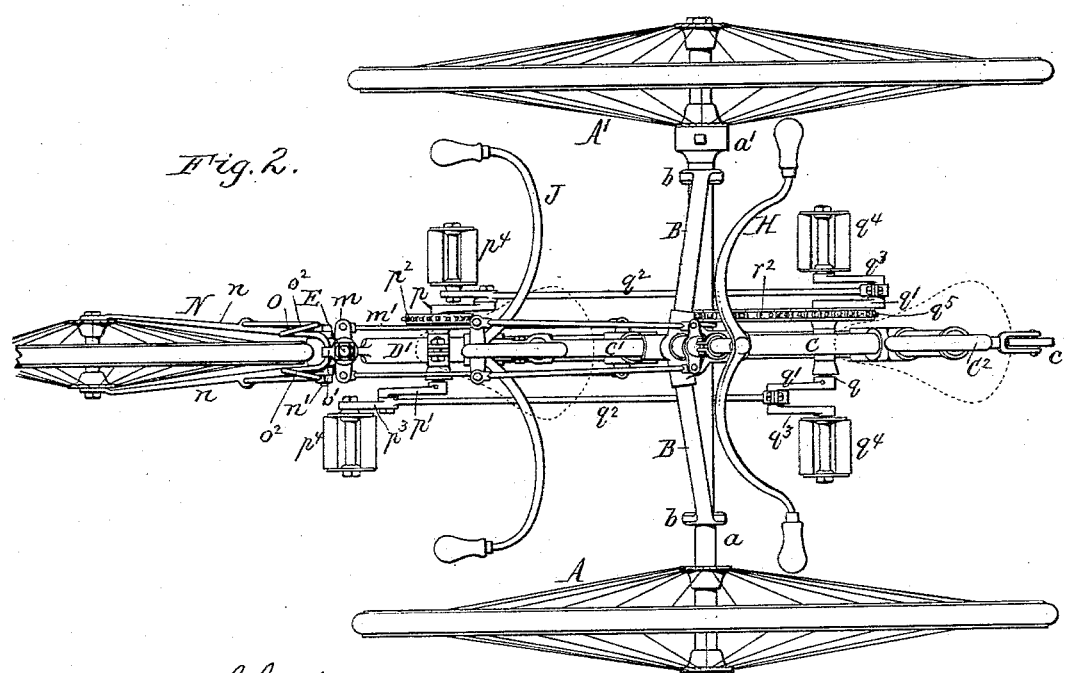
Figure 12:
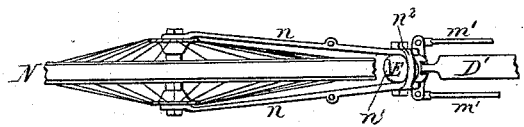
Figure 13:
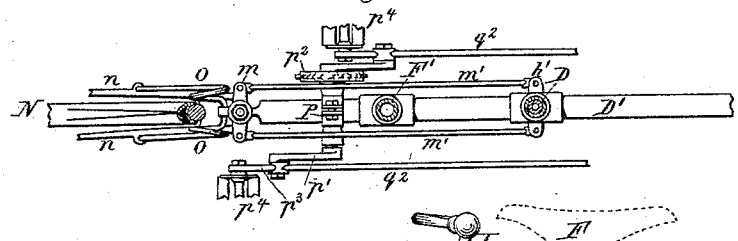
Figure 14:
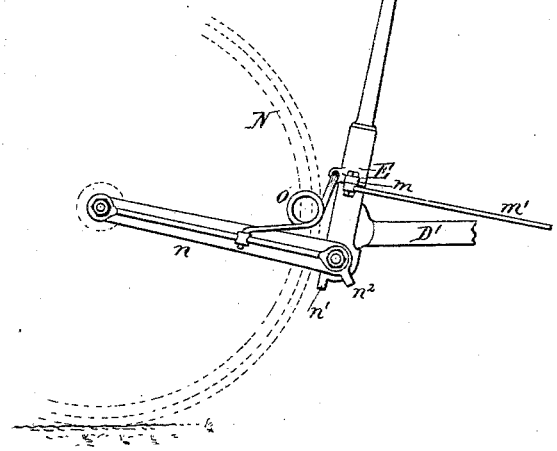

In the accompanying drawings, consisting of three sheets, Figure 1 is a longitudinal sectional elevation of my improved tricycle. Fig. 2 is a top plan view with the saddles and saddle-supports removed and the saddles being indicated by dotted lines. Fig. 3 is a fragmentary rear elevation of the main axle and connecting parts. Fig. 4 is a vertical section of the steering part and connecting parts. Figs. 5 and 6 are cross-sections in lines $x\,x$ and $y\,y$, Fig. 4, respectively. Fig. 7 is a sectional elevation of the front saddle-support. Fig. 8 is a cross-section in line $x\,x$, Fig. 7. Fig. 9 is a horizontal section showing a modified construction of the connection between the front handle-bar and steering-post. Figs. 10 and 11 are top plan views showing modified constructions of the cranks and connecting parts. Fig. 12 is a bottom plan view of the fork and connecting parts. Fig. 13 is a horizontal section in line $x\,x$, Fig. 1. Fig. 14 is a side elevation of the front portion of the machine, showing a modified construction of the front handle-bar.

Like letters of reference refer to like parts in the several figures.

The machine represented in the accompanying drawings belongs to the class known as "front-steering tandems," and is arranged so that either rider can steer and so that a lady can ride on either seat, although it is more especially designed for a lady rider on the front seat, the front of the machine being open, so that a quick and safe dismount can be had from the front seat.

$a$ represents the main axle; A, the driving-wheel rigidly secured to the axle $a$, and A' the driving-wheel, which is secured to the axle by a balance-gear, $a'$, of any suitable or well-known construction.

B B represent inclined tubular arms, forming part of the main frame of the machine and provided at their outer ends with bearings $b\,b$, in which the main axle $a$ is journaled. The inner ends of the arms B are secured above the axle $a$ to a central post, B', which is provided with lateral sockets $b'$ for the reception of the arms B. The post B' is provided with a bearing, $b^2$, in which the central portion of the main axle $a$ is journaled. The post B' is provided below the bearing $b^2$ with a socket, $b^3$, in which is secured the inclined rear brace, C, while the upper portion of the post B' is provided at its front side with a socket, $b^4$, in which is secured the horizontal front brace, C'.

D represents a tubular post or upright raking backwardly and secured with its upper end in a socket formed at the upper end of the post B', and with its lower end in a T-piece, $d$, which is secured to a horizontal tubular bar, D'. The rear end of the latter is secured to the rear brace, C, by a T-piece, $d'$.

E represents the rearwardly-inclined steering-head secured to the front end of the horizontal bar D', which latter is provided with a neck and steering-centers of usual construction.

F represents the front saddle, and $f$ the front saddle-post, provided at its upper end with a forwardly-extending arm, $f'$, to which the supporting-springs $f^2$ of the saddle are adjustably secured by a clamp, $f^3$.

F' represents the tubular upright, in which the saddle-post $f$ is adjustably secured by a clamp, $f^4$. The upright F' is secured with its lower end to the horizontal bar D' by a T-piece, $f^5$.

G represents the rear saddle, and $g$ the rear saddle-post, provided at its upper end with a forwardly-extending arm, $g'$, to which the supporting-springs $g^2$ of the saddle are adjustably secured by a clamp, $g^3$.

G' represents the tubular upright in which the saddle-post $g$ is adjustably secured by a clamp, $g^4$. The upright G' is secured with its lower end to the T-piece $d'$. The rear brace, C, is provided below the T-piece $d'$ with an extension, $C^2$, which carries a safety-wheel, $c$. The uprights F' and G' are raked backwardly, like the post D, whereby the saddles and handle-bars are located in their proper positions to retain the center of gravity as far forwardly as possible, while the parts are enabled to better resist the strains to which they are subjected. The principal members of the frame are constructed of straight pieces of tubing in order to obtain the greatest possible strength with the least weight.

$h$ represents the rear steering-post, which passes through the tubular upright D and the T-piece $d$, and carries at its upper end the rear handle-bar, H, and at its lower end a cross-head, $h'$. The steering-post $h$ is made of tubing and provided at its lower end with a solid plug or stem, $h^2$, which is brazed into the tubular post and extends through the lower end of the T-piece $d$, as represented in Fig. 4. The lower end of the tubular post forms a collar within the T-piece $d$, by which the post is supported in the frame. A portion of the stem $h^2$ below the T-piece $d$ is made square and carries the cross-head $h'$, which is held in place by a screw-nut, $h^3$. The cross-head prevents the steering-post from being drawn upward in the tubular upright D when the rider applies an upward pressure to the handle-bar H. Upon removing the cross-head the steering-post can be withdrawn from the upright D in an upward direction. The handle-bars H are secured to the upper end of the tubular steering-post $h$ by a tubular shank, $h^4$, which enters the upper end of the steering-post and is secured therein by a clamp, $h^5$, so that upon releasing said clamp the handle-bars can be raised and lowered. The upper end of the steering-post is slitted so that it can be tightened to grip the tubular shank $h^4$ by said clamp.

I represents a cross-head, which is secured to the steering-post $h$ above the upright D. The hub of the cross-head I is divided and provided with a clamping-screw, $i$, whereby the cross-head is tightened on the steering-post. The cross-head is provided with two horizontal arms, $i'$ $i'$, which project laterally on opposite sides of the steering-post.

$j$ represents a pendent pivot secured to or formed with the arm $f''$ of the front saddle-post and projecting downwardly therefrom in a position parallel with the uprights D and G'.

J represents the front handle-bar mounted on the pivot $j$, and having its arms bent rearwardly and upwardly and forwardly to bring the handles in the proper position opposite the pommel of the front saddle. The handle-bar J is held on the pivot $j$ by a screw-nut, $j'$.

$k$ $k$ represent laterally-projecting arms which are formed on the hub of the front handle-bar, J, and connected with the arms $i'$ of the cross-head I by rods $k'$, so that the steering-post $h$ can be turned by the front handle-bar, J. The pivot is located far enough forward to prevent the handle-bars from swinging into the wheels, and the arms $k$ $k$ are preferably made longer than the arms of the cross-head I, to shorten the arc through which the front handle-bar is required to move for steering the machine. The arms of the rear handle-bar are made longer than those of the front handle-bar, to give the rear rider better control of the steering. The front handle-bar is raised and lowered with the front saddle in adjusting the latter to different riders, and the cross-head is adjusted in the steering-post $h$ to correspond with the position of the front handle-bar.

$m$ represents a cross-head secured to the steering-head E, and $m'$ represents rods connecting the cross-head $m$ with the cross-head $h'$ at the lower end of the steering-post $h$. The rods $m'$ are arranged on opposite sides of the horizontal bar D'.

It happens sometimes that a single rider wishes to use a tandem machine, in which case the front saddle must be used when the machine is steered by the front handle-bar.

N represents the front steering-wheel, and $n$ $n$ the arms of the fork in which the wheel is journaled, and which is attached to the steering-head E. The rear ends of the arms are connected with the steering-head by a horizontal bolt, $n'$, on which the fork can swing vertically, thereby permitting the steering-wheel to move up and down in passing over an obstruction and reducing the vibration greatly. The fork-arms are held in their normal position by a spring, O, which is connected with its front ends to the arms $n$, and secured to the steering-head by being passed through a lug, $o'$, on the front side of the same. Each branch of the spring O is preferably provided with a coil, $o^2$. The rear ends of the fork-arms $n$ are connected by a bow, $n^2$, which extends around the lower side of the steering-head E, and which prevents twisting of the fork-arms. The upward movement of the steering-wheel is limited by a stop, $n^3$, on the lower side of the steering-head, against which the bow $n^2$ strikes. It is obvious that the two branches of the spring O may be made in two separate pieces, if desired. This device renders the steering as rigid as if the fork were rigidly secured to the steering-head, and permits the steering-wheel to follow the uneven surface of the ground much better than if the fork were rigidly secured to the steering-head.

$p$ represents the front crank-shaft, journaled in suitable bearings which are formed in an adjustable clamp or hanger, P, arranged between the steering-head and the upright F' and secured to the horizontal bar D'.

$q$ represents the rear crank-shaft, journaled in suitable bearings which are formed in an adjustable clamp or hanger, Q, secured to the horizontal bar D' between the T-pieces $d$ and $d'$.

$p'$ represents the cranks, and $p^2$ represents a chain or sprocket wheel secured to the front shaft, $p$.

$q'$ represents the cranks secured to the rear shaft, $q$, and connected with the front cranks, $p'$, by rods $q^2$. The rear cranks are provided with extensions $q^3$, arranged at an angle to the cranks $q'$, and to which the pedals $q^4$ are attached, so as to cause the riders to break step in pedaling, whereby a more continuous application of the power is obtained and less strain is applied to the drive-chain. The front cranks, $p'$, are made shorter than usual, and of the same length as the main portions $q'$ of the rear cranks. The connecting-rods $q^2$ are provided forwardly of the front cranks with raised slotted extensions $p^3$, to which the front pedals, $p^4$, are attached. This locates the front pedals as far in front of the sprocket-wheel $p^2$ as possible, thereby preventing the rider's dress from interfering with the sprocket-wheel.

$q^5$ represents a sprocket-wheel secured to the rear crank-shaft, $q$, in line with the front sprocket-wheel, $p^2$.

$r$ represents a sprocket or chain wheel arranged concentric with the axle $a$, and secured to the balance-gear box $a'$ by a tube, $r'$, which surrounds the axle $a$ and passes through one of the bearings $b$. The wheel $r$ is arranged in line with the crank-wheels $p^2$ and $q^3$, and is connected with one of said wheels by a drive-chain, $r^2$. The rear sprocket-wheel, $q^5$, is larger in diameter than the front sprocket-wheel, $p^2$. When speed is required, the drive-chain is arranged to connect the rear sprocket-wheel, $q^5$, with the wheel $r$. When power is required, the drive-chain is lengthened and arranged to connect the front sprocket-wheel, $p^2$, with the wheel $r$. This driving-gear requires but a single drive-chain and but a single sprocket-wheel on the main axle, which more than compensates for the weight and friction of the connecting-rods. It affords two different speeds, permits the construction of a strong and rigid frame, and furnishes a more desirable action for the front rider.

The connecting-rods $q^2$ may be connected with the cranks in several different ways. In the construction represented in Fig. 10 the connecting-rods are journaled on the pedal-shafts. In this case both pairs of cranks are made of the same length, and a single connecting-rod may be used, if made stiff enough, to push as well as pull. In the construction represented in Fig. 11 both pairs of cranks are made of the same length, and all the pedals are attached to the connecting-rods. It is obvious that a machine may be constructed for more than two riders by providing the necessary seats and attaching the proper number of pedals to the connecting-rods. The front handle-bar may be connected directly to the crosshead I on the steering-post $h$, as represented in Fig. 9.

For a less expensive form of tandem, the steering-head E may be continued upwardly and the front handle-bar be directly secured thereto, as indicated in Fig. 14.

I claim as my invention—

1. The combination, in a velocipede, of a front steering-wheel, rear wheels, a connecting-frame provided with a steering-head between the front and rear wheels, a saddle arranged above the steering-head, an open-fronted handle-bar arranged below the saddle, a steering-post arranged in rear of the saddle, and connecting-bars extending rearwardly from the handle-bar to the upper portion of the steering-post and forwardly from the lower portion of the steering-post to the steering-head, substantially as set forth.

2. The combination, in a tandem velocipede provided with two driving-wheels connected by a rigid frame, and a steering-wheel pivoted to said frame, of a front handle-bar and a rear handle-bar, both pivoted to the frame of the driving-wheels in rear of the pivot of the steering-wheel and in or near the center line of the machine, and connected together and with the steering-wheel, whereby both handle-bars and the steering-wheel move together independently of the driving-wheels, substantially as set forth.

3. The combination, in a velocipede, of a front steering-wheel, rear wheels, a connecting-frame provided with a steering-head between the front and rear wheels, front and rear handle-bars both pivoted to the frame and connected together and with the steering-head, said handle bars being made of unequal length, whereby the longer bar controls the movement of the shorter bar, substantially as set forth.

4. The combination, in a tandem velocipede, of a front handle-bar and a rear handle-bar, and a connecting-rod attached to the bars and at different distances from their fulcrums, whereby one bar controls the other, substantially as set forth.

5. The combination, with the frame, of a vertically-adjustable saddle-support, a pivot secured to the saddle-support, and a handle-bar mounted on said pivot, whereby the handle-bar is raised and lowered with the saddle, substantially as set forth.

6. The combination, with the saddle and saddle-support, of a handle-bar pivoted to the saddle-support underneath the saddle, and curved outwardly, backwardly, and forwardly, substantially as set forth.

7. The combination, with the front steering-wheel, the rear wheels, and the connecting-frame provided with a steering-head between the front and rear wheels, of a front saddle and a rear saddle and their supports, both secured to the frame in rear of the steering-head, a steering-post arranged between the saddles, and having its lower end connected with the steering-head, and a handle-bar secured to the upper end of the steering-post, substantially as set forth.

8. The combination, with the front steering-wheel, the rear wheels, and the connecting-frame provided with a steering-head between the front and rear wheels, of a front saddle and a rear saddle and their supports both secured to the frame in rear of the steering-head, a steering-post arranged between the saddles and having its lower end connected with the steering-head, a rear handle-bar secured to the upper end of the steering-post, a front handle-bar, and a rod connecting the front handle-bar with the steering-post, substantially as set forth.

9. The combination, with the vertically-adjustable support of the front saddle and the handle-bar pivoted thereto, of a steering-post, a cross-head made vertically adjustable on the steering-post, and a rod connecting the handle-bar with said cross-head, substantially as set forth.

10. The combination, with the rear frame provided at its front end with a steering-head, and handle-bars pivoted to the rear frame and connected with the steering-head, of a front steering-wheel, a horizontal fork in which the front wheel is mounted, a horizontal pivot connecting the rear end of the fork with the steering-head, and a spring connecting the steering-head with the fork and permitting the fork to play vertically on its pivot without moving the steering-head and handle-bars, substantially as set forth.

11. The combination, with the rear frame provided at its front end with a steering-head, of a front steering-wheel, a horizontal fork in which the front wheel is mounted, a horizontal pivot connecting the rear end of the fork with the steering-head, and a bent spring provided with two coiled branches, secured at its middle to the steering-head and having its coiled branches connected with the branches of the fork, substantially as set forth.

12. In a tandem velocipede, the combination, with the main axle provided with the driven sprocket-wheel, of two crank-axles arranged, respectively, in front and in rear of the main axle, and each provided with a sprocket-wheel of different diameter arranged in line with the driven sprocket-wheel, and a drive-chain whereby the driven sprocket-wheel can be connected with the sprocket-wheel on either crank-axle at desire, substantially as set forth.

13. In a tandem velocipede, the combination, with the driving-wheel, of two rotating crank-shafts, cranks secured to said shafts, a connecting-rod attached to said cranks at equal distances from the shafts thereof, and pedals attached to said connecting-rod, substantially as set forth.

14. In a tandem velocipede, the combination, with two crank-shafts, of two pairs of cranks secured thereto, rods connecting said cranks, and pedal-extensions formed on one pair of said cranks and projecting beyond the journals of the connecting-rods, substantially as set forth.

15. In a tandem velocipede, the combination, with two crank-shafts, of two pairs of cranks secured thereto, rods connecting said cranks, and pedal-extensions formed on one pair of said cranks at an angle to the cranks, substantially as set forth.

Witness my hand this 29th day of January, 1887.

EMMIT G. LATTA.

Witnesses:
CHAS. J. RICE,
FRED H. RICE.